J. H. A. BOUSFIELD.
DIAL SCALE.
APPLICATION FILED MAY 27, 1916.
1,267,367.
Patented May 28, 1918
2 SHEETS—SHEET 2.
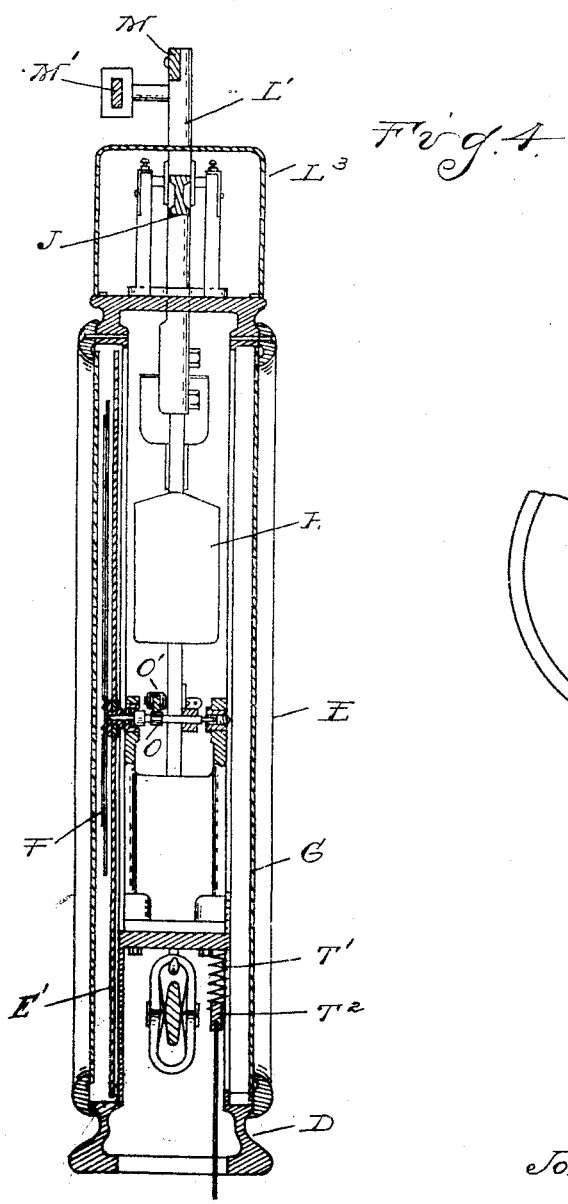
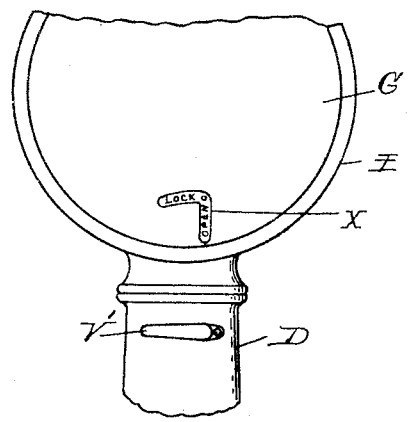
Inventor
John H. A. Bousfield
By Whittemore Hulbert & Whittemore
Attorney

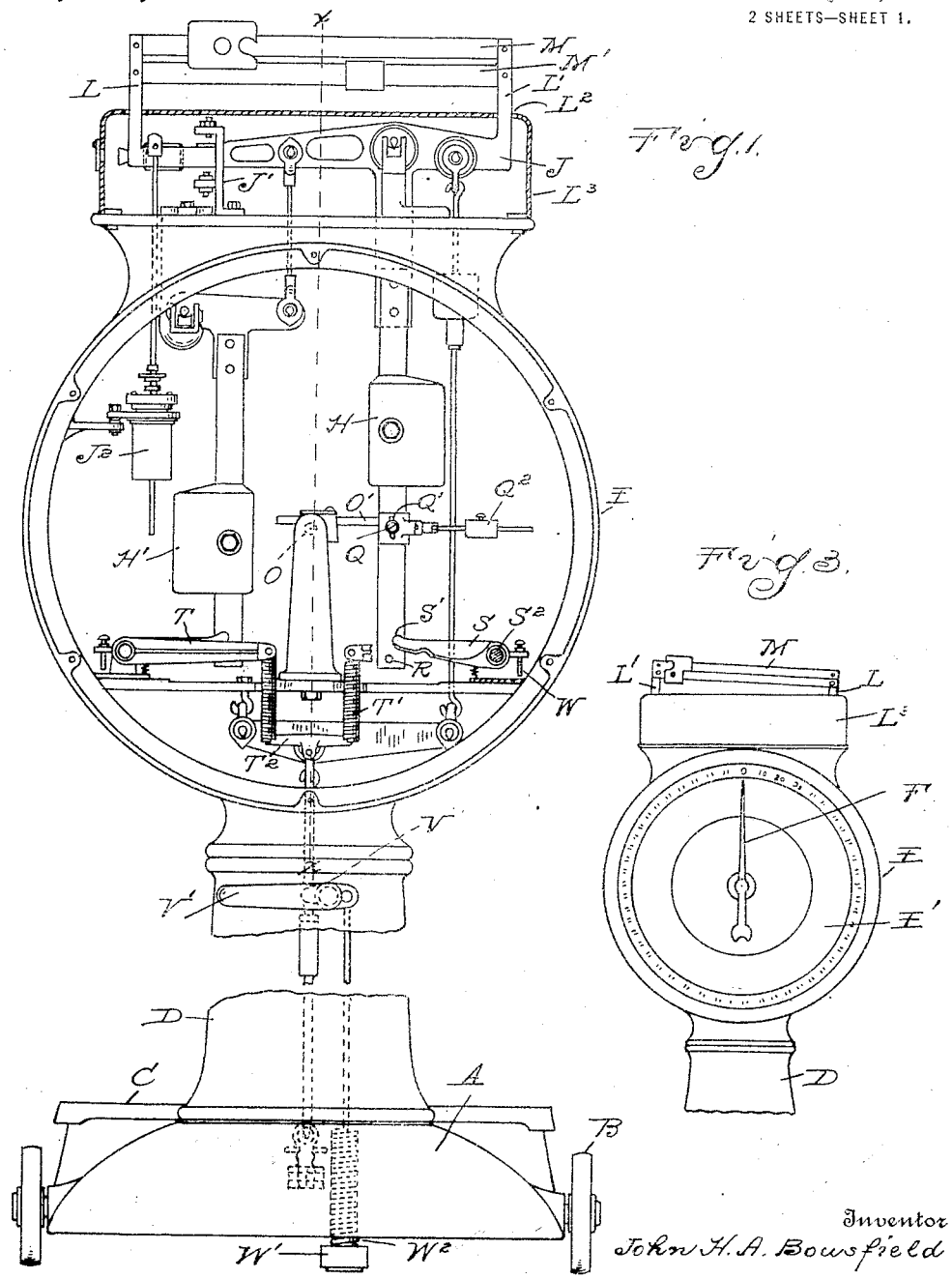

UNITED STATES PATENT OFFICE.

JOHN H. A. BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

DIAL-SCALE.

1,267,367.　　　Specification of Letters Patent.　　Patented May 28, 1918.

Application filed May 27, 1916. Serial No. 100,232.

*To all whom it may concern:*

Be it known that I, JOHN H. A. BOUSFIELD, a citizen of the United States of America, residing at St. Johnsbury, in the county of Caledonia and State of Vermont, have invented certain new and useful Improvements in Dial-Scales, of which the following is a specification, reference being had therein to the accompanying drawings.

This invention relates to dial scales and refers more particularly to an improved construction adapted for a portable dial scale, although the invention in certain of its aspects is not limited to the particular type of scale mentioned.

Among the objects of the invention are to provide means for preventing injury to the delicate dial mechanism when the scale is being moved across the floor; to provide a positive locking arrangement, which when the lever is thrown into locked position will prevent the dial mechanism from shaking out of place while the scale is being moved; to provide improved means for increasing the capacity of the machine beyond that shown on the dial.

The invention further resides in the provision of means for facilitating the accurate calibration of the pointer, in the novel counterbalancing arrangement for obtaining the desired degree of sensibility in the dial, and in such other features of construction and arrangements and combinations of parts as will more fully hereinafter appear.

In the drawings;

Figure 1 is a rear elevational view of a dial scale embodying my invention, the cover-plate being removed;

Fig. 2 is a rear view showing the cover-plate in position;

Fig. 3 is a front elevational view of the upper part of the scale; and

Fig. 4 is a vertical sectional view on line $x$—$x$ Fig. 1.

A designates the portable base mounted on wheels B and carrying the usual load platform C. Positioned at the rear end of the base is an upright D, which supports the dial casing E, the construction being such that practically all of the operating mechanisms are inclosed within the dial casing. The front of the latter has the usual dial face E', over which a rotating pointer F travels, while at the back the dial casing is provided with a removable cover G.

In the particular construction shown in the drawings, the scale has two pendulums H and H', the latter being an auxiliary pendulum, for the purpose of compensating for any unlevel conditions of the scale. The main pendulum H is at its upper end attached to the main beam J, which beam is provided with vertical members L and L' projecting outward through apertures $L^2$ in the dome $L^3$. These projections L and L' are preferably formed integral with the main beam J and support a main bar M and an auxiliary bar M'. The purpose of the former is to increase the capacity of the scale beyond that shown on the dial, while the auxiliary bar M' may be used for tare purposes, if desired. Movement of the main beam J is limited by an adjustable trig J', and is equipped with a dash-pot $J^2$ for steadying its motion.

The following mechanism is employed for actuating the pointer: This mechanism comprises a rack-bar O' attached to the main pendulum and adapted to actuate the pinion O which controls the rotation of the pointer. The connection between this rack-bar and the pendulum is adjustable and is such as to facilitate the accurate calibration of the pointer. It will be noticed that the rack-bar, in place of being secured directly to the pendulum, has a vertically adjustable connection therewith, by means of the bolt Q extending through the slot Q'. This permits the rack-bar to be locked to the pendulum in various positions of vertical adjustment, and a further counterbalancing effect is obtained by the weight $Q^2$, which can be longitudinally adjusted to balance the weight of the rack to any desired extent.

In portable dial scales, the delicate dial mechanisms are often injured when the scale is pulled across a floor, and the present invention contemplates a construction in which the dial mechanism can be locked in zero position and when so locked can be moved without any danger of injury to the parts.

As shown in Fig. 1, the pendulums are provided with pins R, adjacent which extend the ends S' of a pair of locking arms S, the latter being mounted on shafts $S^2$. Upon these same shafts are mounted levers T, which at their inner ends are connected by a pair of helical springs T' to a cross-bar $T^2$. This cross-bar is, in turn, connected to a crank V, which is operable from the exterior of the scale by adjustment of the handle V'.

The arrangement of the locking arms is such that they will engage with the pins in the pendulums when the latter are at the zero position, or when there is no load on the platform. By turning the lever V' so as to lock the arms in engagement with the pins J a positive lock is produced, which will hold the dial mechanism from getting out of place when the scale is moved. For limiting the movement of the locking arms when the lever is turned to open position, I preferably employ a pair of adjustable set-screws W, and for steadying the scale when in unlocked position the opposite side of the crank V is connected to a rubber-faced locking pad or foot W'. The latter is arranged to engage firmly with the floor whenever the scale is in unlocked position, and helical springs $W^2$ are preferably employed for maintaining the tension between the locking pad and the upper portion of the frame. If desired, an indicating member X can be employed to designate when the lever is moved to locked or open position.

The invention, however, is not limited to the details of construction above set forth except as specified in the appended claims.

What I claim as my invention is:

1. The combination in a dial scale having a main and auxiliary pendulum, of pins carried by said pendulums and rockable locking members adapted to engage said pins when the scale is in zero position.

2. The combination in a dial scale having a main and auxiliary pendulum, of pins carried by said pendulums and locking members adapted to yieldably engage said pins when the scale is in zero position, and an operating lever for actuating said locking members.

3. The combination with a portable base, of a dial scale mounted thereon, an operating mechanism for said scale, a locking foot adapted to engage the floor, a locking lever for said operating mechanism and means connecting said locking lever with said operating mechanism and locking foot.

4. In a scale, the combination with a dial indicator, of a pendulum and a rack bar for actuating said indicator, said rack bar having an adjustable connection with said pendulum, and means for locking said rack bar to said pendulum in the various positions of adjustment.

5. In a scale, the combination with a dial indicator, of a rack for actuating the same, a pendulum and a connection between said rack and pendulum vertically adjustable to different selected positions.

6. In a scale, the combination with a dial indicator, of a rack for actuating the same, a pendulum and a connection between said rack and pendulum vertically adjustable to various selected positions, and an adjustable weight for counter-balancing the weight of the rack.

7. The combination with a dial scale having a plurality of pendulums, of pivoted locking arms for engaging said pendulums, pivoted levers for actuating said locking arms, a cross-bar, springs connecting said cross-bar to the ends of said pivoted levers, and a crank for operating said cross-bar.

8. The combination with a portable base, of a scale mounted thereon, operating mechanism for said scale, means for locking said operating mechanism, and means upon said scale dependent upon said locking means for bearing firmly against the floor when said operating mechanism is unlocked.

In testimony whereof I affix my signature.

JOHN H. A. BOUSFIELD.

Witnesses:
OSMAR A. ULLRICH,
GEO. R. BOLLINGER.